Figure 1:
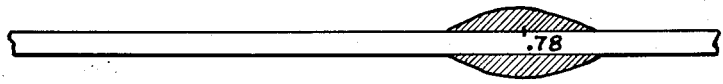

May 6, 1958  W. C. FRIEDLAND ET AL  2,833,696
CULTURE PROCESS FOR ERYTHROMYCIN A
Filed March 1, 1954

Inventors
Frank W. Denison, Jr.
Waldo C. Friedland
Merlin H. Peterson
By William E. Dominick
Attorney

United States Patent Office 2,833,696
Patented May 6, 1958

2,833,696

CULTURE PROCESS FOR ERYTHROMYCIN A

Waldo C. Friedland, Waukegan, Frank W. Denison, Jr., Lake Bluff, and Merlin H. Peterson, Waukegan, Ill., assignors to Abbott Laboratories, North Chicago, Ill., a corporation of Illinois Application March 1, 1954, Serial No. 413,386

12 Claims. (Cl. 195—80)

The present invention relates to a method of producing the antibiotic erythromycin and more particularly to an improved method of cultivating an erythromycin-producing organism in a neutrient medium to produce in said medium erythromycin A substantially free of erythromycin B and C.

Erythromycin is an antibiotic obtained by culturing a strain of *Streptomyces erythreus* in a culture medium containing an assimilable amount of carbohydrates, nitrogen, and inorganic salts, and recovering the erythromycin antibiotic from the culture medium. It has been found that the erythromycin antibiotic produced by the organism *Streptomyces erythreus* in a deep culture fermentation process may comprise a mixture of several closely related antibiotic materials which have been identified as erythromycin A, erythromycin B, and erythromycin C. The presence of one or more of the foregoing erythromycin type antibiotics is readily determined by well-known paper strip chromatography techniques.

Erythromycin A, which was originally thought to comprise the only erythromycin antibiotic produced by the deep culture fermentation of *Streptomyces erythreus*, possesses antibiotic activity against many organisms, both gram positive and gram negative. Erythromycin A is distinguishable from erythromycin B and C, however, by having a higher degree of activity against susceptible micro-organisms. The antibiotic properties of erythromycin A together with its low toxicity make erythromycin A of great utility as a therapeutic agent in the treatment of many diseases.

It is, therefore, an object of the present invention to provide an improved method of producing erythromycin A.

It is also an object of the present invention to provide an improved method of obtaining erythromycin A by the deep culture fermentation of *Streptomyces erythreus*.

It is a further object of the present invention to provide an improved nutrient medium for the deep culture fermentation of an erythromycin-producing strain of *Streptomyces erythreus*.

It is a still further object of the present invention to provide an improved method of producing substantially increased yields of erythromycin.

Other objects of the invention will be apparent from the detailed description and claims to follow.

It has been discovered that in the normal deep culture fermentation of an erythromycin-producing strain of *Streptomyces erythreus* in a culture medium containing an assimilable source of carbohydrates, nitrogen, and inorganic salts wherein the nitrogen content of the culture medium does not exceed approximately 1.3 mg./ml. of the culture medium no detectable amounts of erythromycin B and C are produced while large amounts of erythromycin A are being produced. Thus, when the organism *Streptomyces erythreus* (Waksman) is subjected to deep culture fermentation in the presence of the usual nutrient medium containing nitrogenous material in an amount which produces a nitrogen level of between about 0.5 and 1.3 mg. nitrogen per ml. of culture medium, erythromycin A is produced free of amounts of erythromycin B and C so far as can be determined by standard paper chromatography methods. Thus, a means of effecting production of substantial amounts of erythromycin A free of other erythromycins including erythromycin B and C is in regulating the nitrogen content of the culture medium within the specified limits.

Any standard procedure can be employed in fermenting the erythromycin-producing organism, such as that set forth in U. S. Patent 2,653,899. Accordingly, it is possible to use the conventional deep culture fermentation equipment, any suitable fermentation media containing an assimilable source of carbohydrates, nitrogen, and inorganic salts which have a nitrogen content within the above specified limits. The usual aseptic techniques and rates of flow of air through the fermentation medium are likewise employable.

The present invention is illustrated as applied to the fermentation of erythromycin-producing organisms in a nutrient medium containing, in addition to assimilable carbohydrates, nitrogenous material, and inorganic salts, lipids, such as the naturally occurring fats and oils of animal and vegetable origin although the synthetic fats and oils are also useful. Thus, for example, caloric fats and oils which are useful in the present invention as a further source of carbon are lard oil, corn oil, soy bean oil, cottonseed oil, sesame oil, olive oil, coconut oil, margarine oil, and glycerol trioleate, have been used. All of the foregoing caloric fats can be added to the nutrient medium prior to inoculation with the organism or the fat can be added intermittently during the fermentation cycle.

The following specific examples are set forth for the purpose of illustrating the present invention and should not be construed to limit the invention to the particular ingredients or proportions disclosed.

*Example I*

An aqueous fermentation culture medium adjusted to pH 6.0 and having a nitrogen content of about 0.80 mg./ml. is prepared containing the following ingredients:

| | G./l. |
|---|---|
| Starch | 15 |
| Soy bean meal grits | 10 |
| Calcium carbonate | 1.0 |
| Lard oil | 30 |

The culture medium having the foregoing composition and having a volume of approximately 12 liters is sterilized at a temperature of 121° C. for a period of 75 minutes. Thereafter the sterile culture medium is inoculated with 4% by volume of a 72-hour vegetative aerated bottle culture of *Streptomyces erythreus* (Waksman), NRRL 2338, and the inoculated medium fermented in a 30 liter fermenter at a temperature of 32° C., aerated at a rate of 0.80 vol./vol./minute with agitation at a rate of 480 R. P. M. and for a period of 138 hours.

Figure 2:
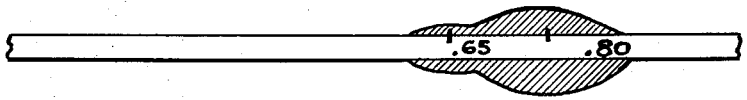

The distribution of the erythromycin produced in the above fermentation medium is shown in Figure 1 of the drawing wherein the paper chromatography strip obtained by using 0.01 N ammonium hydroxide saturated with methyl isobutyl ketone shows the presence of only erythromycin A exhibiting an Rf of 0.78. The foregoing paper chromatography strip can be compared with the paper chromatography strip shown in Figure 2 of the drawing wherein a culture medium containing 1.57 mg. nitrogen per ml. culture medium used shows the presence of erythromycin A having an Rf of 0.80 and erythromycin B having an Rf of 0.65.

*Example II*

An aqueous fermentation culture medium adjusted to pH 6.0 and having a nitrogen content of about 1.15 mg./ml. culture medium is prepared containing the following ingredients:

| | G./l. |
|---|---|
| Starch | 15 |
| Soy bean meal grits | 10 |
| Corn steep solids | 2.5 |
| Calcium carbonate | 1.0 |
| Lard oil | 30 |

The culture medium having the foregoing composition and have a volume of approximately 12 liters is sterilized at a temperature of 121° C. for a period of 75 minutes. Thereafter the sterile culture medium is inoculated with 4% by volume of a 72-hour vegetative aerated bottle culture of Streptomyces erythreus (Waksman), NRRL 2338, and the inoculated medium is fermented in a 30 liter fermenter at a temperature of 32° C., while aerating at a rate of 0.80 vol./vol./minute and agitating at a rate of 480 R. P. M. for a period of 162 hours.

Figure 3:
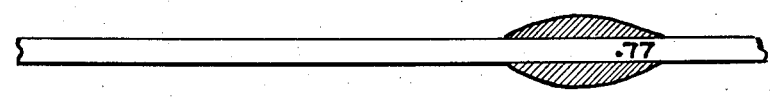

The distribution of the erythromycin produced in the above fermentation process is shown in Figure 3 of the drawing wherein the paper chromatography strip obtained by using 0.01 N ammonium hydroxide saturated with methyl isobutyl ketone identifies the presence of only erythromycin A which has an Rf of .77.

Example III

An aqueous fermentation culture medium adjusted to pH 6.0 and having a nitrogen content of about 1.15 mg./ml. culture medium is prepared containing the following ingredients:

| | G./l. |
|---|---|
| Starch | 15 |
| Soy bean meal grits | 10 |
| Corn steep solids | 2.5 |
| Sodium chloride | 5.0 |
| Calcium carbonate | 1.0 |
| Lard oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 46-hour vegetative seed fermentation culture of Streptomyces erythreus (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

The distribution of the erythromycin produced in the above fermentation process as indicated by the paper chromatography strip obtained using 0.01 N ammonium hydroxide saturated with methyl isobutyl ketone identifies the presence of only erythromycin A having an Rf of .74 and shows the absence of any erythromycin B or erythromycin C.

Example IV

An aqueous fermentation culture medium adjusted to pH 6.0 and having a nitrogen content of about 1.23 mg./ml. culture medium is prepared containing the following ingredients:

| | G./l. |
|---|---|
| Starch | 15 |
| Soy bean meal grits | 5 |
| Cottonseed flour | 5 |
| Corn steep solids | 2.5 |
| Sodium chloride | 5.0 |
| Calcium carbonate | 1.0 |
| Cottonseed oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 46-hour vegetative seed fermentation culture of Streptomyces erythreus (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

Figure 4:
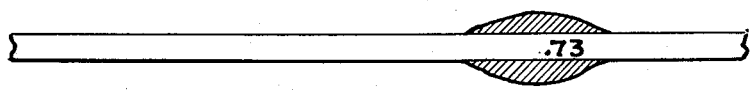

The distribution of the erythromycin produced in the above fermentation process is shown in Figure 4 of the drawing wherein the paper chromatography strip obtained by using 0.01 N ammonium hydroxide saturated with methyl isobutyl ketone identifies the presence of only erythromycin A having an Rf of .73 and shows the absence of erythromycin B and C.

Example V

An aqueous fermentation culture medium adjusted to pH 6.0 and having a nitrogen content of about 1.15 mg./ml. culture medium is prepared containing the following ingredients:

| | G./l. |
|---|---|
| Starch | 15 |
| Soy bean meal grits | 10 |
| Corn steep solids | 2.5 |
| Sodium chloride | 5.0 |
| Calcium carbonate | 1.0 |
| Corn oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 46-hour vegetative seed fermentation culture of Streptomyces erythreus (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

Figure 5:
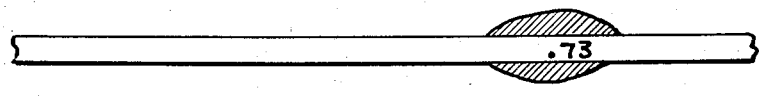

The distribution of the erythromycin products produced in the above fermentation process is shown in Figure 5 of the drawing wherein the paper chromatography strip obtained by using 0.01 N ammonium hydroxide saturated with methyl isobutyl ketone identifies the presence of only erythromycin A having an Rf of .73 and shows the absence of erythromycin B and C.

Example VI

An aqueous fermentation culture medium adjusted to pH 6.0 and having a nitrogen content of about 1.11 mg./ml. culture medium is prepared containing the following ingredients:

| | G./l. |
|---|---|
| Starch | 15 |
| Soy bean meal grits | 5 |
| Corn steep solids | 2.5 |
| Ammonium acetate | 2.0 |
| Sodium chloride | 5 |
| Sodium carbonate | 1.0 |
| Soy bean oil | 30 |

The culture medium having the foregoing composition and having a volume of approximately 30 gallons is sterilized at a temperature of 124° C. for a period of 45 minutes. Thereafter the sterile culture medium is inoculated with 10% by volume of a 46-hour vegetative seed fermentation culture of Streptomyces erythreus (Waksman), NRRL 2338, and the inoculated medium is fermented in a 50 gallon fermenter at a temperature of 33° C., while aerating at a rate of 1.0 vol./vol./minute and agitating at a rate of 250 R. P. M. for a period of 140 hours.

Figure 6:
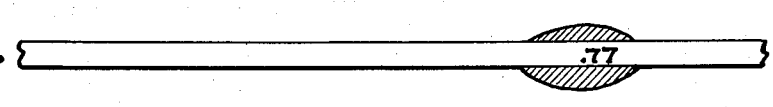

The distribution of the erythromycin produced in the above fermentation process is shown in Figure 6 of the drawing wherein the paper chromatography strip obtained by using 0.01 N ammonium hydroxide saturated with methyl isobutyl ketone identifies the presence of only erythromycin A having an Rf of .77 and shows the absence of erythromycin B and C.

To recover the erythromycin A, an erythromycin salt solution, such as erythromycin acetate or erythromycin sulfate from erythromycin fermentation broth at a pH of at least about 8.5 is stirred with an organic solvent for the erythromycin, such as acetone, ethyl alcohol, and isopropyl alcohol, and a highly water soluble inorganic salt as a salting out agent, such as sodium chloride, said salt being present at a concentration of at least about 200 grams per liter of the original erythromycin salt solution. The resulting agitated solution is then, either before or after heating, adjusted to an alkaline pH of at least between about pH 9.5 to 11.0 and heated to a temperature of between 35° and 45° C.; whereupon a phase separation is effected with substantially the entire erythromycin activity being contained in the acetone phase and the salt constituents being contained in the aqueous phase. It is preferable to initially adjust the pH of the erythromycin salt solution to about pH 8 to 8.5, and then heat to a temperature of between about 35–45° C., add the said organic solvent and salting out agent, and then finally adjust the pH of the mixture to between pH 10 and 10.8. Thereafter, to the recovered acetone phase at a temperature of about 35–45° C. is added sufficient water to cause the acetone solution to become turbid at about 45° C. and the solution is cooled to about 15–20° C. and allowed to crystallize at room temperature or below without agitation for about 12 hours. The solution is then filtered, the crystals washed with aqueous acetone at a temperature of about 10–15° C., and dried in vacuo at about 70° C. The crystalline erythromycin base thus obtained has a bio-potency of at least about 900 units erythromycin per mg.

As a specific example of the isolation of erythromcyin A produced by the hereinbefore disclosed fermentation processes, the erythromycin fermentation broth is extracted with amyl acetate at pH 10.5 and the amyl acetate solution is extracted with aqueous acetic acid to form an erythromycin acetate salt solution (1200 ml.) and is agitated at a temperature of 38° C. with the following ingredients in the order listed:

510 ml. acetone
320 g. sodium chloride
20% sodium hydroxide solution to pH 10.5

The mixture is agitated for 15 minutes after the above ingredients have been added. Agitation is then stopped and the acetone layer containing the erythromycin A activity separates from the aqueous salt solution. The acetone phase (300 ml.) represents about 97% of the original erythromycin A activity contained in the erythromycin acetate salt solution. The acetone solution of the erythromycin A base obtained in the above manner at a temperature of 30° C. is admixed with 220 ml. of water at 40° C. to give a turbid solution from which the erythromycin base crystallizes. The solution is allowed to crystallize without agitation for about 12 hours at room temperature. The crystals are filtered, washed with 50% acetone at 20° C., and the crystals dried in vacuo at 70° C. for 24 hours. A yield of about 85% of erythromycin A base is obtained based on the original erythromycin A acetate salt solution. The erythromycin A base has an anhydrous bio-potency of about 900 units erythromycin per mg.

The erythromycin A product produced in the foregoing procedures exhibits a melting point of 137–140° C. The infrared absorption sepectrum of a 5% chloroform solution of erythromycin A in a 0.09 mm. cell is characterized by an absorption band at 10.46 microns and is distinguishable from erythrmoycin B by the absence of absorption bands at 7.52, 10.59, and 11.24 microns which are characteristic of erythromycin B. The ultraviolet absorption spectrum of a 1% ethanol solution of erythromycin A exhibits a co-efficient of extinction $E_{1\ cm.}^{1\%}=0.395$ at 288 m$\mu$. Erythromycin A exhibits a specific rotation of $-78°$ at a temperature of 25° C. as a 2% ethanol solution. The paper chromatography strip of erythromycin A as above produced has an Rf of about 0.69–0.79. The microanalysis of erythromycin A shows 60.87% carbon, 9.22% hydrogen, 2.02% nitrogen, 28.14% oxygen (by diff.), and 17.98% C—CH$_3$.

Suitable sources of nitrogen for the fermentation process include a wide variety of substances such as the amino acids, casein, both hydrolyzed and unhydrolyzed, fish meal, cottonseed flour, soy bean meal, meat extracts, liver cake, and various other nitrogenous substances of vegetable or animal origin. Chemicals such as urea, nitrates, and ammonium compounds may also be added to the nutrient media as a source of nitrogen. Corn steep liquor, because of the wide variety of substances contained therein, both organic and inorganic, has been found to be a valuable addition to the fermentation media. It is not possible, of course, because of the crude nature of many of these nitrogenous substances to specify definite proportions of the material to be added.

In common with most fermentation processes, the process of the present invention is conducted with a liquid medium containing certain inorganic salts such as phosphates. Among elements which may be desirable in small amounts are potassium, calcium, magnesium, sulfur, iron, and certain elements in traces. When using crude substances as a source of nitrogen or carbon, however, such as corn steep liquor, many of these elements are contained therein and need not be added to the medium.

As a carbon source, there may be used ordinary starch, the so-called soluble starches, and sugars such as sucrose, glucose, maltose, dextrose, or the like and other water soluble or partially water soluble carbohydrate substances such as sugar alcohols, etc. And, as previously indicated, a caloric fat is desirably incorporated in the culture medium, preferably in an amount between about 0.25% and 6.0% based on the volume of the culture medium.

Others may readily adapt the invention for use under various conditions of service, by employing one or more of the novel features disclosed or equivalents thereof. As at present advised with respect to the apparent scope of our invention, we desire to claim the following subject matter.

We claim:
1. A method of producing an erythromycin A-containing fermentation broth having as the erythromycin component therein substantially only erythromycin A which comprises: forming a fermentation culture medium containing an assimilable source of carbon, inorganic salt, and nitrogen; the nitrogen content of said medium being a maxium of about 1.2 mg./ml. culture medium; and cultivating under aerobic conditions an erythromycin-producing strain of *Streptomyces erythreus* therein to form a substantial amount of the said erythromycin A in the said culture medium without having therein appreciable amounts of other erythromycin products.

2. A method substantially as described in claim 1 wherein the culture medium contains a lipid in an amount between about 0.25% and 6.0% based on the volume of the said culture medium.

3. A method of producing an erythromycin A-containing fermentation broth having as the erythromycin component thereof substantially only evrythromycin A which comprises: forming a fermentation culture medium containing an assimilable source of carbon, inorganic salt, and nitrogen; the nitrogen content of said medium being between about 0.5 and 1.3 mg./ml. culture medium; and cultivating under aerobic conditions an erythromycin-producing strain of *Streptomyces erythreus* therein to form a substantial amount of the said erythromycin A in the said culture medium without having therein appreciable amounts of other erythromycin products.

4. A method substantially as described in claim 3 wherein the culture medium contains a lipid in an amount between about 0.25% and 6.0% based on the volume of the said culture medium.

5. A method of producing an erythromycin A-containing fermentation broth having a major proportion of erythromycin A therein without detectable amounts of erythromycin B or C which comprises: forming a fermentation culture medium containing an assimilable source of carbohydrate, inorganic salt, and nitrogen; the nitrogen content of said culture medium being between about 0.80 and 1.3 mg. nitrogen per ml. culture medium; and cultivating under aerobic conditions an erythromycin-producing strain of *Streptomyces erythreus* therein to form a substantial amount of erythromycin A in said culture medium without having therein a detectable amount of erythromycin B or C.

6. A method substantially as described in claim 5 wherein the culture medium contains a lipid in an amount between about 0.25% and 6.0% based on the volume of the said culture medium.

7. A method of producing the antibiotic erythromycin A which comprises: forming a fermentation culture medium containing an assimilable source of carbon, inorganic salt, and nitrogen; the nitrogen content of said medium being a maximum of about 1.2 mg./ml. culture medium; cultivating under aerobic conditions an erythromycin-producing strain of *Streptomyces erythreus* therein to form a substantial amount of erythromycin A in said culture medium without having therein an appreciable amount of other erythromycin products; and recovering the said erythromycin A from said culture medium substantially free of other erythromycin products.

8. A method substantially as described in claim 7 wherein the culture medium contains a lipid in an amount between about 0.25% and 6.0% based on the volume of the said culture medium.

9. A method of producing the antibiotic erythromycin A which comprises: forming a fermentation culture medium containing an assimilable source of carbon, inorganic salt, and nitrogen; the nitrogen content of said medium being between about 0.50 and 1.3 mg./ml. culture medium; cultivating under aerobic conditions an erythromycin-producing strain of *Streptomyces erythreus* therein to form a substantial amount of erythromycin A in said culture medium without having therein an appreciable amount of other erythromycin products; and recovering the erythromycin A from said culture medium substantially free of other erythromycin products.

10. A method substantially as described in claim 9 wherein the culture medium contains a lipid in an amount between about 0.25% and 6.0% based on the volume of the said culture medium.

11. A method of producing the antibiotic erythromycin A without the co-presence of erythromycin B or C which comprises: forming a fermentation culture medium containing an assimilable source of carbohydrate, inorganic salt, and nitrogen; the nitrogen content of said culture medium being between about 0.80 and 1.3 nitrogen per ml. culture medium; cultivating under aerobic conditions an erythromycin-producing strain of *Streptomyces erythreus* therein to form a substantial amount of erythromycin A without having therein appreciable amounts of erythromycin B and C; and recovering the erythromycin A from the said culture medium substantially free of erythromycin B and C.

12. A method substantially as described in claim 11 wherein the culture medium contains a lipid in an amount between about 0.25% and 6.0% based on the volume of the said culture medium.

References Cited in the file of this patent

UNITED STATES PATENTS

| 2,653,899 | Bunch et al. | Sept. 29, 1953 |

FOREIGN PATENTS

| 679,087 | Great Britain | Sept. 10, 1952 |

OTHER REFERENCES

Pettings et al.: 76 J. A. C. S., January 20, 1954, pages 569–571.

Flymn: 76 J. A. C. S., June 20, 1954, pages 3121 to 3131.